(12) United States Patent
Ma et al.

(10) Patent No.: US 7,475,991 B2
(45) Date of Patent: Jan. 13, 2009

(54) POLARIZING BEAMSPLITTER ASSEMBLY

(75) Inventors: Jiaying Ma, Maplewood, MN (US);
Michael K. Domroese, Woodbury, MN (US); Stephen K. Eckhardt, White Bear Lake, MN (US); Glendon D. Kappel, Eagan, MN (US); Hamid R. Mortazavi, Woodbury, MN (US); Michael J. Raykowski, Lake Elmo, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 469 days.

(21) Appl. No.: 11/315,811

(22) Filed: Dec. 22, 2005

(65) Prior Publication Data

US 2007/0146644 A1 Jun. 28, 2007

(51) Int. Cl.
| | |
|---|---|
| G03B 21/14 | (2006.01) |
| G03B 21/00 | (2006.01) |
| G03B 21/16 | (2006.01) |
| G03B 21/18 | (2006.01) |
| G03B 21/22 | (2006.01) |
| G02F 1/1335 | (2006.01) |
| G02B 27/10 | (2006.01) |

(52) U.S. Cl. ............................ 353/20; 353/33; 353/52; 353/119; 349/9; 359/618

(58) Field of Classification Search ............ 353/20, 353/33, 52–61, 119, 122; 349/9, 161; 361/704; 165/185; 359/618, 820
See application file for complete search history.

(56) References Cited

U.S. PATENT DOCUMENTS

| | | | |
|---|---|---|---|
| 4,974,132 A | 11/1990 | Naum | |
| 5,882,774 A | 3/1999 | Jonza et al. | |
| 5,962,114 A | 10/1999 | Jonza et al. | |
| 6,109,767 A | 8/2000 | Rodriguez | |
| 6,288,844 B1 | 9/2001 | Edlinger et al. | |
| 6,486,997 B1 | 11/2002 | Bruzzone et al. | |
| 6,529,250 B1 | 3/2003 | Murakami et al. | |
| 6,532,044 B1 | 3/2003 | Conner et al. | |
| 6,550,919 B1 | 4/2003 | Heine | |
| 6,557,999 B1 | 5/2003 | Shimizu | |

(Continued)

FOREIGN PATENT DOCUMENTS

EP    1 431 781    6/2004

(Continued)

OTHER PUBLICATIONS

"Metric Beam Dump", Edmund Optics Inc., Barrington, New Jersey, USA [on line], [retrieved from the internet on Oct. 6, 2005], URL www.edmundoptics.com/onlinecatalog/DisplayProduct.cmf?productid=2193 pp. 1-2.

(Continued)

*Primary Examiner*—Melissa J Koval

(57) ABSTRACT

An optical unit that includes a polarizing beamsplitter (PBS). The PBS includes a reflective polarizer that transmits a portion of a light beam that has a first polarization and reflects a portion of the light beam that has a second polarization. A light absorbing device is operatively disposed relative to the PBS. The light absorbing device receives the light either transmitted or reflected by the PBS. The light absorbing device includes a light capture portion having a structured surface.

17 Claims, 5 Drawing Sheets

U.S. PATENT DOCUMENTS

| | | | |
|---|---|---|---|
| 6,592,224 | B2 | 7/2003 | Ito et al. |
| 6,609,795 | B2 | 8/2003 | Weber et al. |
| 6,646,806 | B1 * | 11/2003 | Bierhuizen ................. 359/618 |
| 6,719,426 | B2 | 4/2004 | Magarill et al. |
| 6,778,228 | B2 | 8/2004 | Murakami et al. |
| 6,811,261 | B2 | 11/2004 | Kurumisawa |
| 6,914,654 | B2 | 7/2005 | Janssen |
| 6,916,440 | B2 | 7/2005 | Jackson et al. |
| 6,936,209 | B2 | 8/2005 | Jackson et al. |
| 6,939,499 | B2 | 9/2005 | Merrill et al. |
| 6,949,212 | B2 | 9/2005 | Merrill et al. |
| 7,077,526 | B2 * | 7/2006 | Overmann et al. ............ 353/52 |
| 7,152,979 | B2 * | 12/2006 | Ellis et al. .................... 353/60 |
| 2004/0227898 | A1 | 11/2004 | Ma et al. |
| 2004/0227994 | A1 | 11/2004 | Ma et al. |
| 2005/0012996 | A1 | 1/2005 | Miyazawa et al. |
| 2006/0028620 | A1 | 2/2006 | Conner |
| 2006/0103791 | A1 | 5/2006 | Zhu et al. |

FOREIGN PATENT DOCUMENTS

| | | |
|---|---|---|
| JP | 06222321 | 8/1994 |
| KR | 10-2004-0007775 | 1/2004 |
| KR | 10-2005-0055235 | 6/2005 |
| WO | WO 2004/072713 | 8/2004 |

OTHER PUBLICATIONS

"Black Reflections", [retrieved from the internet on Oct. 6, 2005], URL www.mazepath.com/uncleal/blade.htm.

"10BD—Beam Dump", Standa in Lithuania, Vilnius, Lithuania, [retrieved from the internet on Oct. 6, 2005], URL www.stand.lt/products/catalog/lasers_laser_accessories?item=202&prod+beam_dump.

Campbell, P., et al., "Light trapping and reflection control in solar cells using tilted crystallographic surfaces textures", *Solar Energy Materials and Solar Cells 31* (Apr. 25, 1993) 133-153 North-Holland.

U.S. Appl. No. 11/315,723 entitled "Projection System Using Reflective Polarizers" filed Dec. 22, 2005.

Electronic Projection—Fixed Resolution Projectors, ANSI/NAPM IT7.228-1997, Feb. 13, 1997.

* cited by examiner

POLARIZING BEAMSPLITTER ASSEMBLY

FIELD OF THE INVENTION

The invention relates to optical systems and more particularly to the optical systems that use polarizing beamsplitters for separating or combining light beams in different polarization states.

BACKGROUND

The function of a polarizing beamsplitter (PBS) is to reflect light in one polarization state and to transmit light in the orthogonal polarization state. Consequently, PBSs find widespread use in optical systems that rely on the polarization of the light. An example of one such system is an image projection system that uses a liquid crystal display (LCD) panel as an "imager" for modulating an illumination light beam. A polarized illumination light beam is directed to the LCD panel and the light beam is spatially modulated by the LCD panel so that the beam contains some unmodulated light in the polarization state of the illumination beam and some modulated light having a polarization state orthogonal to the illumination light beam. The unmodulated, non-image light is reflected by the PBS and the modulated, image light, which contains the desired image, is transmitted through the PBS. Thus, the PBS separates the image light from the non-image light and the image light can then be projected to a screen for viewing by a user.

Different types of PBS may be used: projection systems have been reported using MacNeille PBSs, which rely on a stack of quarter wave films of isotropic material oriented at Brewer's angle for one of the polarization states, and using a Cartesian polarizer, including a wire grid PBS or a multilayer optical film (MOF) PBS, which uses a stack of alternating isotropic and birefringent polymer materials. The Cartesian MOF PBS is capable of operating at lower f-numbers and with higher contrast and transmission than the MacNeille PBS.

PBSs are often formed as a polarizing layer sandwiched between the hypotenuses of two glass prisms. The transmitted light is directed a different direction than the reflected light (for example at an angle of 90 degrees).

When a PBS is used in the optical path prior to arriving at an imager, the light reflected by the polarizer can usually be reflected back toward the light source. However, in the case of a transmissive imager, once light has passed through the imager, light reflected by subsequent polarizers cannot be allowed to be reflect back through the imager. Light reflected by these polarizers must be absorbed elsewhere in the projector so as to not reach the lens of the projector and detrimentally affect the image quality.

The polarizers typically used in projection systems have usually been absorptive type polarizers. An absorptive polarizer absorbs the majority of the light energy that is not of the desired polarization. Such a polarizer can absorb a relatively large amount of energy and the temperature of the polarizer tends to rise significantly. In many situations it is necessary to provide considerable airflow at high speeds over the polarizer in order to maintain the polarizer temperature below acceptable limits. In some cases, the required airflow volume and/or speed can be quite high and the size and number of fans needed in the projection device can consume a significant amount of electrical power and space in the projection device.

SUMMARY OF THE INVENTION

The invention is an optical unit that includes a polarizing beamsplitter (PBS). The PBS includes a reflective polarizer that transmits a portion of a light beam that has a first polarization and reflects a portion of the light beam that has a second polarization. A light absorbing device is operatively disposed relative to the PBS. The light absorbing device receives the light either transmitted or reflected by the PBS. The light absorbing device includes a light capture portion having a structured surface.

The above summary of the present invention is not intended to describe each illustrated embodiment or every implementation of the present invention. The following figures and detailed description more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
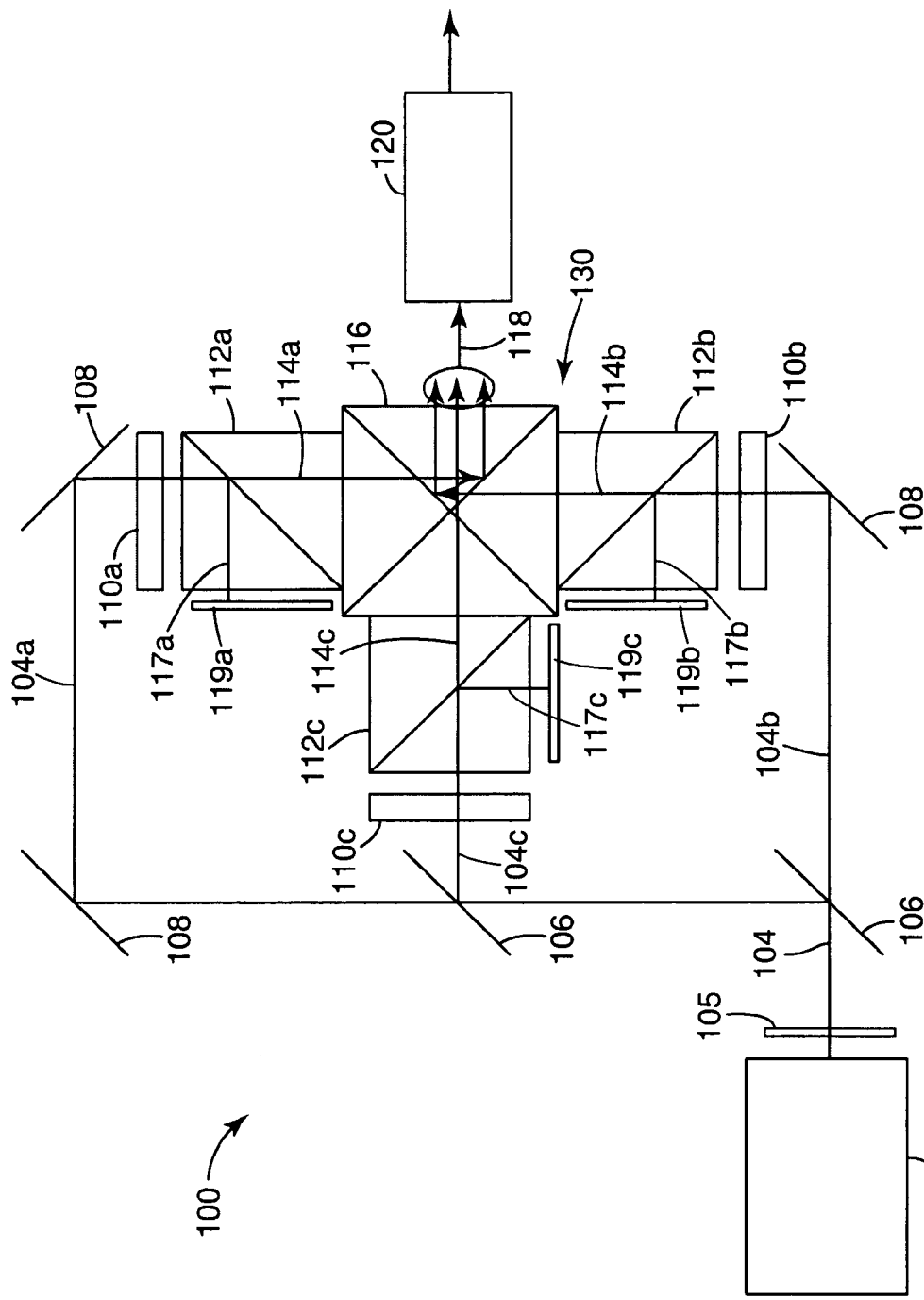
FIG. 1 schematically illustrates an embodiment of a projection system according to principles of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is applicable to systems that use polarizing beamsplitters (PBSs), and is believed to be particularly useful for image projection systems that incorporate PBSs for separating image light generated using a polarization modulator from illumination light. While the invention may be useful in any application where a PBS is used, it is described below particularly as used in projection systems. The scope of the invention is not intended to be limited to only projection systems.

Additionally, the invention may be used in many different types of projection systems. One exemplary embodiment of a multi-panel projection system 100 that may incorporate the invention described below is schematically illustrated in FIG. 1. The projection system 100 is a three-panel projection system, having a light source 102 that generates a light beam 104, containing light in three different color bands. The light beam 104 can be polarized as it exits the light source 102 or may pass through one or more pre-polarizers 105. Light beam 104 is split by color splitting elements 106 (for example dichroic mirrors) into first, second and third beams 104a, 104b and 104c containing light of different colors. The beams 104a, 104b and 104c may be, for example, red, blue, and green in color respectively. Beam steering elements 108, for example mirrors or prisms, may be used to steer any of the beams 104, 104a, 104b and 104c.

The beams 104a, 104b and 104c are directed to respective image forming devices 110a, 110b and 110c which may be, for example, LCD-based image-forming panels, such as High Temperature Poly-silicon (HTPS) transmissive LCD panels. The light beams 104a, 104b and 104c are directed to the respective image-forming devices 110a, 110b and 110c via respective mirrors 108. The image-forming devices 110a, 110b and 110c polarization modulate the incident light beams 104a, 104b and 104c so that the respective image beams 114a, 114b and 114c are separated by the PBSs 112a, 112b and 112c and pass to the color combiner unit 116. Non-image light beams 117a, 117b and 117c are directed away from the color combiner unit 116 to light absorption devices 119a, 119b and 119c.

In the illustrated exemplary embodiment, the illumination light beams 104a, 104b and 104c are separated by the PBSs 112a, 112b and 112c so as to transmit the resulting image light beams 114a, 114b and 114c through the PBSs 112a, 112b and 112c. In another approach, illustrated in FIG. 1A, the resulting image light beams 114a, 114b and 114c may be reflected by the PBSs 112a, 112b and 112c to the color combiner unit 116 and the non-image light beams 117a, 117b and 117c may be transmitted through the PBSs to the light absorption devices 119a, 119b, and 119c.

Figure 1A:
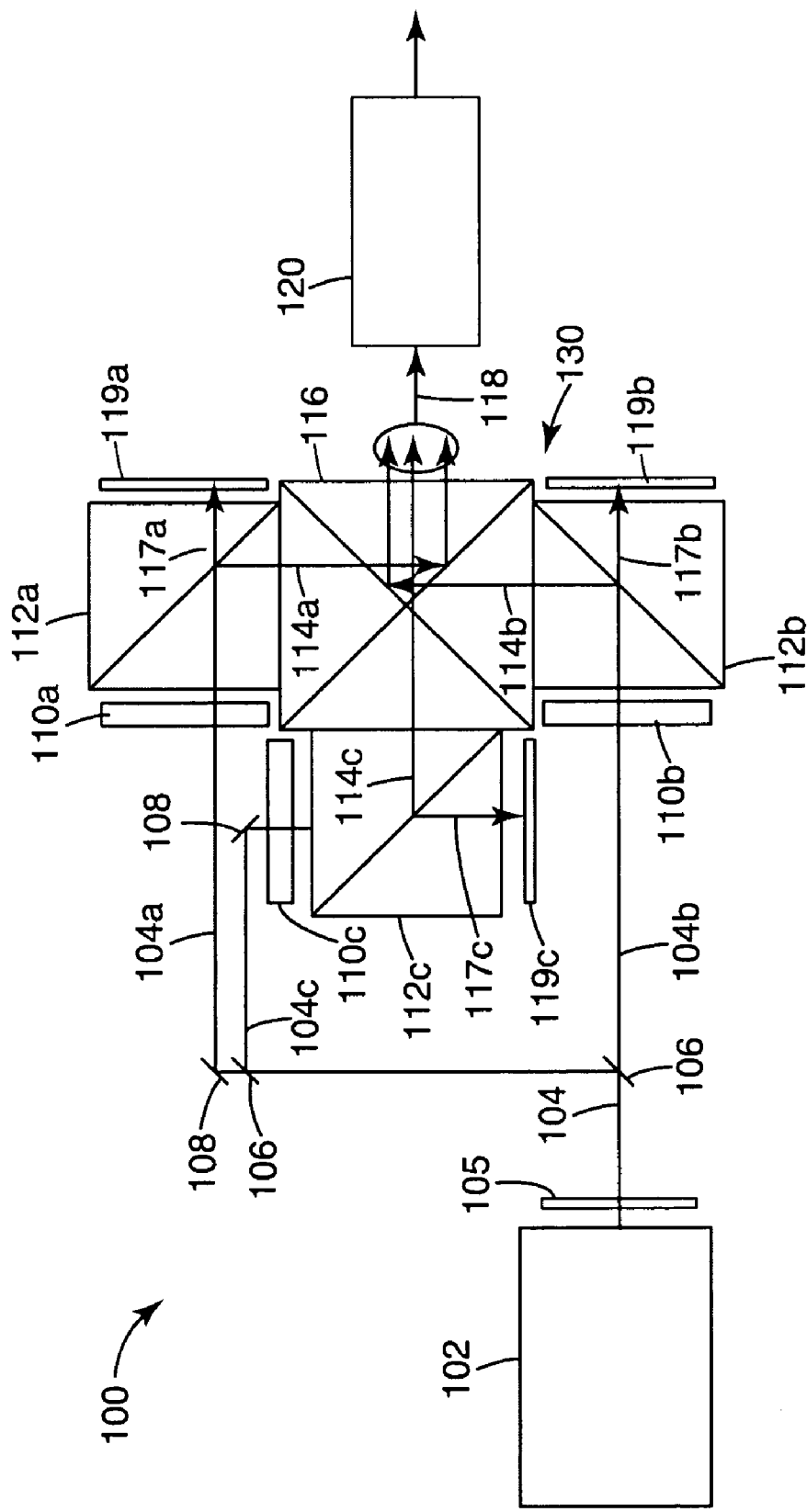
FIG. 1A schematically illustrates an alternate embodiment of a projection system according to principles of the present invention.

In either the configuration of FIG. 1 or the configuration of FIG. 1A, the non-image light beams 117a, 117b, and 117c are not absorbed, as would be the case if an absorptive type polarizer were being used. Consequently, the PBSs 112a, 112b and 112c do not absorb much energy and remain relatively cool. In most cases the temperature of the PBSs 112a, 112b and 112c will be low (typically between 25° C. and 45° C.), without forced air cooling. Comparatively, the current absorptive type polarizers need forced air cooling to achieve acceptable temperatures (typically around 70° C.) in typical projection applications. Thus, the current invention provides a level of cooling that can be achieved by relying only on natural convection heat transfer (i.e. without the need for fans).

Another advantage of the current invention is to enable projector designers to use smaller, potentially less expensive imagers for the same lumens output. The amount of light converted to heat (or putting it another way, heat generated) by the absorptive polarizer limits the light intensity acceptable for use with the absorptive polarizer. Smaller imagers result in more light being directed through a smaller area, increasing light intensity. As light intensity increases on the polarizer, more light is converted to heat in a smaller area. Thus the imager size that can be used is limited by the amount of light intensity (heat) that the polarizer can bear. Reflective polarizers can survive much higher light intensity since the temperatures they are subjected to is much lower, due to the fact that the light is reflected rather than converted to heat. Therefore, smaller imagers can be used.

It should be mentioned that the temperature of the light absorption devices 119a, 119b, and 119c can be allowed to reach much higher temperatures than can be tolerated by an absorptive polarizer. The life of a typical absorptive polarizer is highly dependent on maintaining its temperature below acceptable limits, whereas a light absorber outside the image light path can be made of materials that operate at much higher temperatures without experiencing any adverse effects. Higher temperature of the light absorbers and heat sinks with respect to the surrounding air temperature leads to more efficient transfer of heat. More efficient heat transfer requires less air flow and therefore smaller or fewer fans to achieve the desired rate of energy transfer.

Reducing the number and size of the fans in the device may allow the size of the projection device to be considerably reduced. Fewer and smaller fans will create less noise. It may also allow the physical size and electrical capacity of the power supply in the device to be reduced. In addition, a high volume of airflow requires the air filters in the projection system to be replaced more frequently. Failure of the user to replace the air filters at appropriate time intervals can also be more detrimental to the life of the projection system if relatively large air flow is essential to keep the system and component temperatures below recommended limits.

Since reflective polarizers can redirect the light that is not transmitted by the polarizer to a light absorption device, the light absorption device, which may include a heat sink (as described later), can be located outside of the optical path. It is easier to configure a system to cool the light absorption device outside of the light path than it is to provide significant airflow over an absorptive polarizer located directly in the light path. Directing airflow into the light path presents more challenges in keeping dust out of the light path.

A further advantage to the current system is that an absorptive polarizer must frequently be mounted to a thermally conductive yet optically transmissive material (e.g. sapphire) in order to allow an adequate thermal mass and path to distribute the heat and cool the polarizer. The use of materials such as sapphire increases the cost of the projection system. In addition, an absorptive polarizer, even when mounted to a material such as sapphire, presents a limited surface area from which energy can be removed to cool the polarizer. It can require a relatively high volume and velocity of air to maintain the absorptive polarizer temperature below acceptable limits.

The reflective polarizer described in the present invention directs the light energy away from the primary light path to the light absorption device. There is much more flexibility in the size and surface area of the light absorption device since it is not located in the light path. It can therefore require much less airflow over the light absorption device when compared to the airflow necessary over an absorptive polarizer. Lower airflow provides many advantages, including fewer fans, smaller fan sizes, less fan noise, reduced power supply requirements, smaller overall projection system size and weight, less frequent need to change air filters.

Typical absorptive polarizers often have a shorter life than many of the other components in an optical projection system. Thus, the use of reflective polarizers can significantly increase the life of the overall projection system.

In order to efficiently use reflective polarizers in the projection system, the light reflected by the PBSs 112a, 112b and 112c must not be allowed to interfere with the image light beams 114a, 114b and 114c created by the projection system 100. Light absorption devices 119a, 119b and 119c provide a unique way to capture this light and also provide a simple and efficient thermal management of the projection system 100.

In the illustrated exemplary embodiment, the color combiner unit 116 combines image light beams 114a, 114b and 114c of different colors, for example using one or more dichroic elements. In particular, the illustrated exemplary embodiment shows an x-cube color combiner, but other types of combiner may be used. The three image beams 114a, 114b and 114c are combined in the color combiner unit 116 to produce a single, colored image beam 118 that may be directed by a projection lens system 120 to a screen (not shown).

Other embodiments of projection systems may use one or more PBSs. For example, a projection system may use one or two image-forming devices (e.g. HTPS transmissive LCD imagers), with respective PBSs. Additionally, the maximum number of image-forming devices is not limited to three, and projection systems may use more than three image-forming devices. It should be noted that different types of light sources may be used, including white light sources, such as high-pressure mercury lamps, and colored light sources, such as light emitting diodes. The intention is not to limit how the illumination light reaching the PBS is generated, or how the light is processed before reaching the PBS.

It is often convenient to provide an optical core comprising the PBS, or PBSs, attached to an optical element. For example, the projection system 100 of FIG. 1 shows the PBSs 112a, 112b, 112c attached to the color combiner unit 116. Attaching the PBSs can be accomplished, for example, using an optical adhesive such as a pressure sensitive adhesive or optical epoxy, forming an optical core 130.

While the invention is believed to be useful for many different types of reflective polarizer layers in a PBS, it is believed to be particularly useful for Cartesian Multilayer Optical Film (MOF) PBSs, for example the polarizing films described in co-owned U.S. Pat. No. 6,486,997, incorporated herein by reference. The invention may also be effective for the other types of PBSs, such as the MacNeille PBS and a wire grid PBS, with a glass element between the polarizing layer and the image-forming device.

Figure 2:
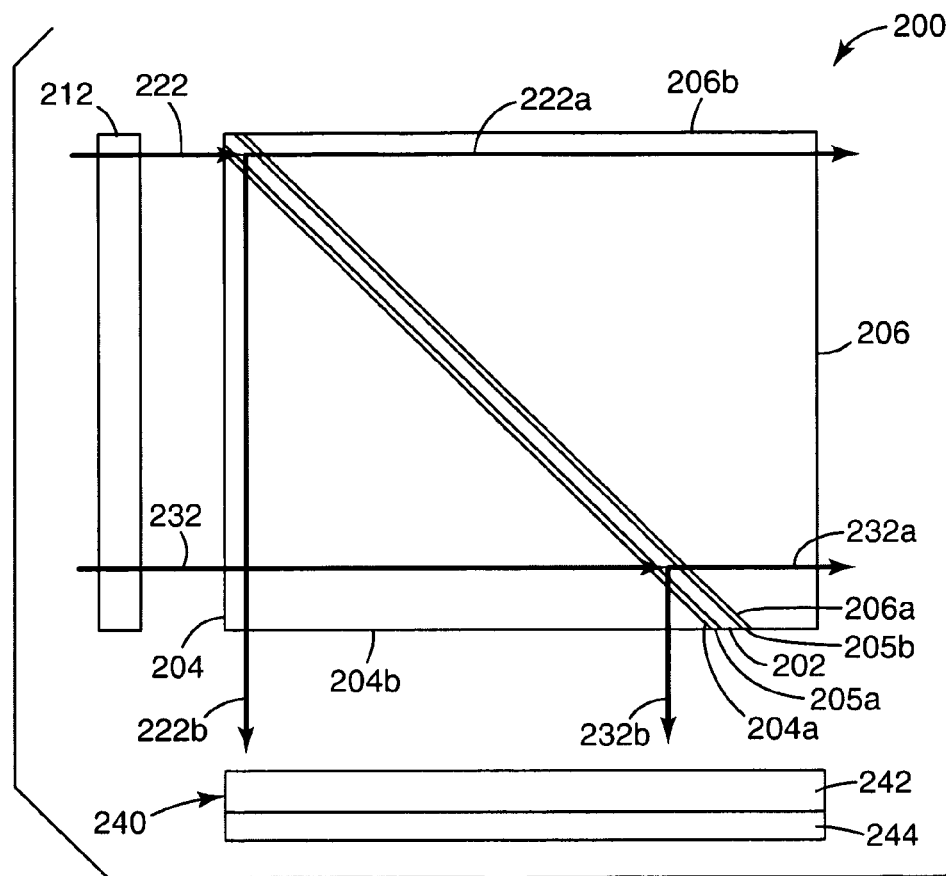
FIG. 2 schematically illustrates the operation of a polarizing beamsplitter.
Figure 3:
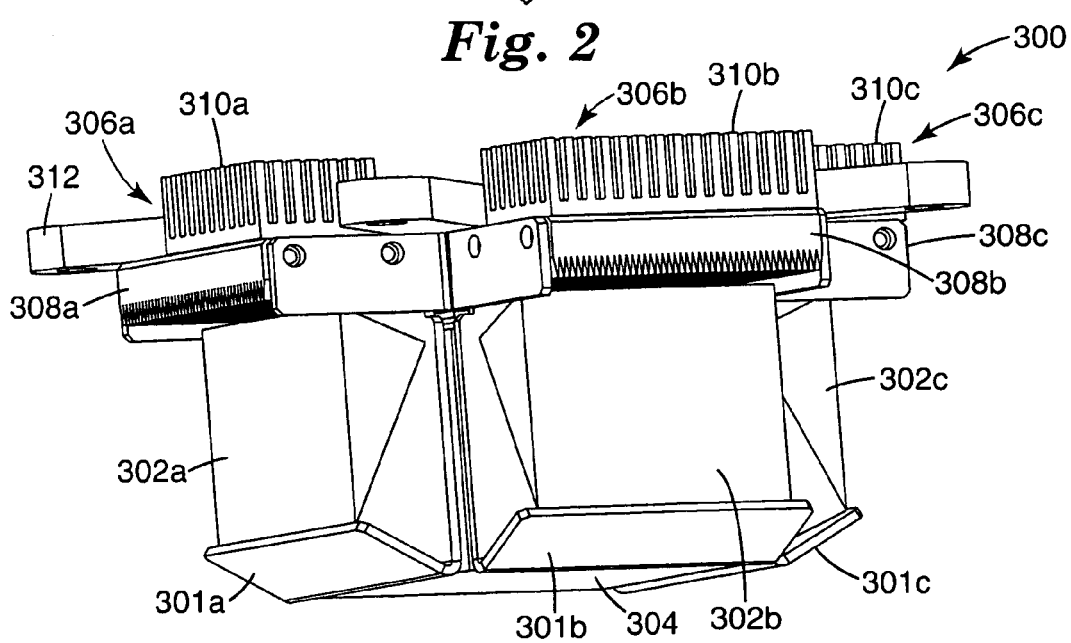
FIG. 3 is an isometric view of one embodiment of an optical core according to principles of the present invention.
Figure 3A:
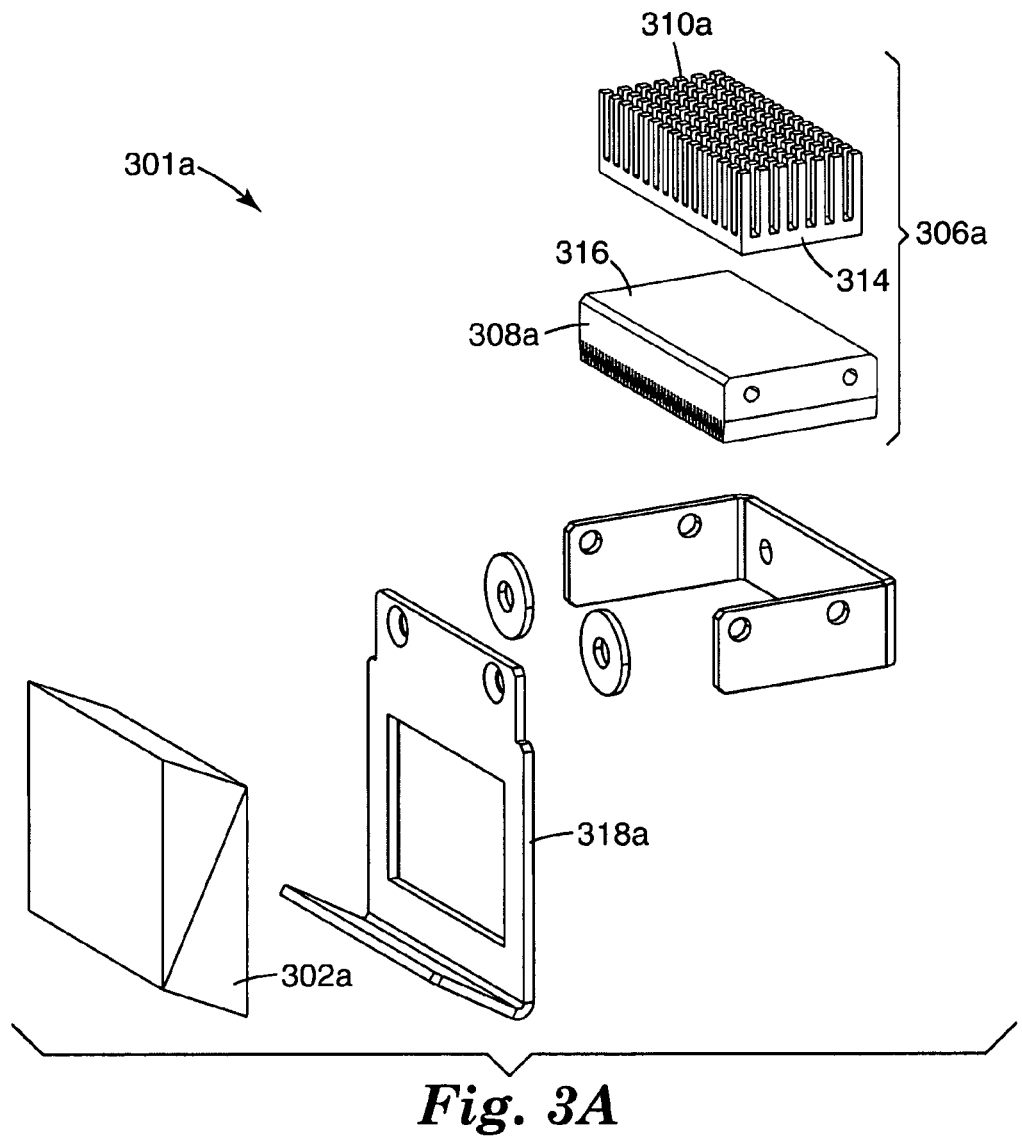
FIG. 3A is an isometric exploded view of one PBS assembly from the optical core of FIG. 3.

FIG. 2 schematically illustrates a PBS 200 that has a reflective polarizing layer 202 sandwiched between opposing first surfaces 204a, 206a of two covers 204, 206. The covers 204, 206 may be in the form of prisms, having additional second surfaces 204b, 206b that are non-parallel to the surfaces 204a, 206a for transmitting light into and out of the PBS 200. In the illustrated embodiment, the covers 204, 206 are right angled prisms with the opposing surfaces 204a, 206a disposed at 45° relative to second surface 204b, although the surfaces 204a, 206a may be disposed at different angles (other than 45°), such as shown in FIGS. 3 and 3A and shown and described in U.S. Pat. No. 6,592,224, and U.S. Pat. No. 6,719,426 the contents of which are incorporated by reference in their entirety herein. The covers 204, 206 may be attached to the reflective polarizing layer 202 using, for example, layers of adhesive 205a, 205b between the reflective polarizing layer 202 and the covers 204, 206 respectively. One suitable example of an adhesive is an optical epoxy as taught in U.S. Patent Publication No. 2004/0234774A1, incorporated herein by reference.

In some embodiments, the reflective polarizing layer 202 may be a multilayer optical film reflective polarizer, formed of alternating layers of different polymer materials, where one of the sets of alternating layers is formed of a birefringent material: the refractive indices of the different materials are matched for light polarized in one linear polarization state and unmatched for light in the orthogonal linear polarization state. In one particular embodiment, the refractive indices of the different materials are matched in the thickness direction of the layers as well as one of the lateral directions as described in U.S. Pat. Nos. 5,882,774, and 6,609,795, incorporated herein by reference. Incident light in the matched polarization state is substantially transmitted through the layer 202 and the light in the unmatched polarization state is substantially reflected by the layer 202.

Other types of reflecting polarizer layer may be used, for example, a stack of inorganic dielectric layers, as is often used in a MacNeille PBS, or wire grid polarizers used in glass prisms, as taught in U.S. Pat. No. 6,719,426, or any other polarization selective layer used in a similar way. The reflective polarizing layer 202 may be cemented to the covers 204, 206 in a manner similar to that described above.

When unpolarized illumination light or light of mixed polarization states is incident on the PBS 200, the reflective polarizing layer 202 substantially reflects light in one polarization state, referred to here as the s-polarization state, and substantially transmits the orthogonal polarization state, referred to here as the p-polarization state. It should be noted, however that, when the PBS is a Cartesian MOF, the polarization states of the reflected and transmitted light are determined in reference to fixed material axes of the PBS: they are determined by the direction of a physical anisotropy of the reflecting polarizing layer itself. For a MacNeille polarizer, the polarization directions are determined with reference to the plane of reflection at the polarizer. Accordingly, the terms s-polarization and p-polarization are here used to denote the orthogonal polarization states of light that are primarily reflected and transmitted by the PBS respectively, both in the case of the MacNeille PBS, where this nomenclature is strictly accurate, and in the case of Cartesian PBSs, where the nomenclature is approximately and substantially accurate, and remains convenient. Wire grid polarizers and MOF polarizers are both examples of Cartesian polarizers.

In FIG. 2, beams 222 and 232 are transmitted through an image-forming device 212. P-polarized light is transmitted by the reflective polarizing layer 202 as beams 222a and 232a, and s-polarized light is reflected as beams 222b and 232b. The s-polarized light is absorbed by a light absorption device 240 that includes a light capture portion 242 and a heat dissipation portion 244.

FIG. 3 illustrates an exemplary optical core 300 including three PBS assemblies 301a, 301b, and 301c. The three PBS assemblies are used to attach three PBSs 302a, 302b, and 302c to an X-cube 304. Light absorption devices 306a, 306b, and 306c are mounted in the light path of the non-image light directed from the PBS. In one embodiment, the mounting can be done using a bracketing system that secures to the PBS, typically to a non-optical face or to some other structure within the end device, such as a projector housing. Light absorption devices 306a, 306b and 306c are positioned near PBSs 302a, 302b and 302c, respectively, to collect and dissipate the energy from non-image light. The light absorption devices 306a, 306b and 306c include light capture portions 308a, 308b and 308c and heat dissipation portions 310a, 310b and 310c. A bracket 312 can be used to support the optical core 300 and provide a mounting structure to mount the optical core 300 to the end system, such as a projection system.

An advantage of using reflective polarizers is that the surface from which the absorbed light energy is transferred to the surrounding air can be much larger than the typical area available when using an absorptive polarizer. A large area available for heat transfer will require less air flow to achieve the needed energy transfer. In some cases a large heat sink might allow the needed energy transfer to be achieved using only free convection (no fan blowing over heat sink).

FIG. 3A illustrates an exploded view of PBS assembly 301a from FIG. 3. It should be noted that the below discussion is equally applicable to PBS assemblies 301b and 301c. Light capture portion 308a of light absorption device 306a is designed to absorb as much light as possible. In one embodiment light capture portion 308a has reflectivity at least as low or lower than the face of the PBS with which it is associated (by way of example, face 204b illustrated in FIG. 2). By doing this, it assures that the light absorption device 306a is not the most reflective surface in the optical path. Reducing reflection and increasing capture of non-image light will reduce the amount of light scattering in the final application device (e.g. a projector) so that contrast will not be affected by unwanted non-image light being projected through the projection lens.

The light absorption device 306a also includes heat dissipation portion 310a. The heat dissipation portion 310a is designed to efficiently conduct heat generated by the light capture portion 308a away from an absorbing surface 314 and dissipated. In the illustrated embodiment, this is done by using a finned heat sink for the heat dissipation portion 310a. An example of a heat sink that would fit on top of the light absorbers is aluminum heat sink extrusion profile H-1000 from Wakefield Thermal Solutions, Inc., Pelham, N.H. In one embodiment, the extrusion would be cut to approximately 0.57 inch (1.4 cm) lengths to fit on the light capture portions, and would be approximately 0.39 inch (1 cm) wide by approximately 0.25 inch (0.64 cm) tall to fit on top of the light capture portion 308a while still fitting inside a typical projector housing. It should be noted that the design of the end projector housing could cause a variation in the size and shape of the heat sinks to be used.

Heat dissipation portion 310a is secured to a back surface 316 of the light capture portion 308a to help conduct the absorbed light energy away to the surrounding air. In one embodiment, the heat dissipation portion 310a is secured to the light capture portion 308a by using, for example, adhesive such as 3M Scotch-Weld Epoxy DP-100 or DP-460, from 3M Company, St. Paul, Minn., or pressure sensitive adhesive tape such as 3M Thermally Conductive Tape (9882, 9885, 9890 etc.), from 3M Company or thermally conductive epoxies such as Omegabond 101 from Omega Engineering, Inc., Stamford, Conn.

Although the light capture portion 308a and the heat dissipation portion 310a are shown as independent parts in this illustration, the light capture portion 308a and heat dissipation portion 310a can be one integral part. For example, the light capture portion 308a can function alone to dissipate heat, or a heat dissipation portion 310a can be integrally formed or fabricated with the light capture portion 308a.

Mounting assembly components 318a, 318b and 318c are used to secure the PBS 302a in place relative to the light capture portion 308a and further securing the PBS assembly 301a to the X-cube (see FIG. 3). It should be noted that the light capture portion 308a can be mounted in the optical path of the non-image light beams (see 117a, 117b and 117c of FIGS. 1 and 2) in a variety of fashions, including but not limited to using brackets (as shown), or by securing the light absorption device 306a to the PBS, such as to an area outside of the clear aperture on an optical face. Whatever securing method is used should be chosen so as to not interfere with the optical performance of the associated PBS.

Figure 4:
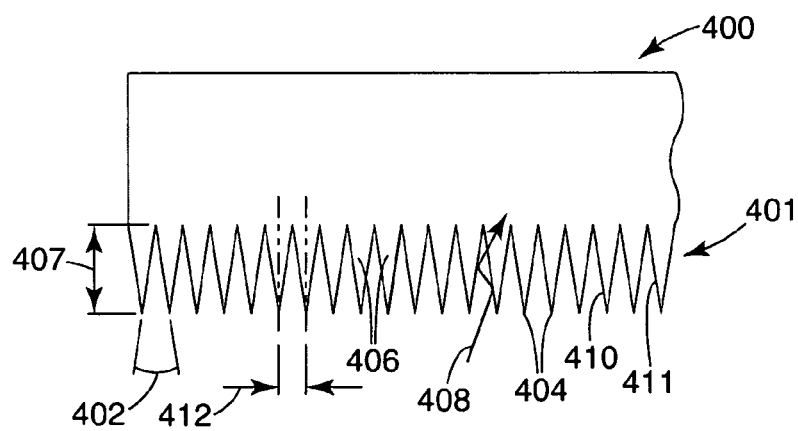
FIG. 4 schematically illustrates a partial light capture portion according to principles of the present invention.

FIG. 4 schematically illustrates one embodiment for a light capture portion 400 providing one method for reducing reflectivity. One preferable material to form the light capture portion 400 from is anodized aluminum. A typical black anodized aluminum surface has ~4% total reflection, which could be large enough to affect contrast inside a projector. The light used inside a projector is typically very concentrated. Concentrated light will tend to bleach the anodized aluminum surface during the lifetime of the projection device. Bleaching of the anodized aluminum will cause increased reflectivity, which can affect projector contrast. Prior light absorption devices, such as laser beam dumps are not useful in the current invention because they would not be economical and would require a large amount of space if used in the current invention. The current invention allows for the light capture portion 400 to be manufactured using less precise, more economical machining or fabrication techniques.

In the current invention, to decrease the reflectivity of the light capture portion 400, a structured surface 401 is formed on the light capture portion 400 and positioned to receive the non-image light beams. In one embodiment, the structured surface 401 uses included angles 402 and sharp corners 404 to form V-sections 406 to reduce effective reflectivity of the material forming the light capture portion 400 (e.g. anodized aluminum). V-sections 406 have a depth 407. Incident light 408 is reflected multiple times, thus the light can be completely absorbed, or if it should be reflected (i.e. not completely absorbed or captured) out of the light absorber, it is greatly reduced. The multiple reflections utilize a larger absorbing area to reduce the concentration of the light. Two reflections on a surface that reflects about 4% of the light (e.g., a typical black anodized aluminum surface) will reduce the total reflection to 4%*4%=0.16%. It should be noted that the light capture portion 400 geometry illustrated will tend to be more effective if the corners 404 and the included angles 402 that form the V-sections 406 can be made quite sharp. In addition, design of the V-section 406 also increases total absorption area.

To illustrate, assuming the included angle 402 forming V-section 406 is $\alpha$, the total absorbing area of anodized surface 410 of V-section 406 will be $1/\sin(\alpha/2)$ times that of a corresponding flat surface (e.g. with no V-section). In one embodiment, $\alpha$ is 25 degrees (or less), resulting in a total absorbing area 4.6 times that of a flat surface area. By increasing the light absorbing area, more space is available to absorb energy. The light intensity on the anodized surface 410 of the V-section 406 is significantly reduced, and the degree of bleaching of the anodized surface 410 will be reduced over time. As is clear from the above calculation, smaller angles 402 and sharper corners 404 forming the V-sections 406 will tend to provide a more effective light capture portion 400.

In another embodiment, included angle 402 is about 20 degrees or less and depth 407 of cut is approximately 0.07 inch (0.2 mm) For f/2.0 illumination, it is preferable that incident light rays be reflected at least 7 times before exiting a light capture portion 400 with these specifications. Additionally, sharp corners 404 have a spacing 412 of approximately 0.02 inches (0.5 mm) and are machined to form an angle of about 20 degrees, such that the incident light impinges on a side 411 of the V-section 406 rather than impinging on the corner 404 itself, thereby increasing the likelihood of reflection back into the PBS (see e.g. FIG. 3).

In order to minimize bleaching of the anodization used on light capture portion 400, one embodiment of the current invention uses a two-step anodizing process (sometimes referred to as a Duranodic coating) on the light absorbers.

The large absorbing area of the light capture portion 400 also provides a relative large area from which the heat can be conducted to the surrounding air. The geometry of the light capture portion 400 also helps it act as an effective heat sink. The energy absorbed by the light capture portion 400 must be transferred as heat away from the light capture portion 400 and out of the end application device in order to maintain the temperature in the device, such as a projection system, below allowable limits.

The V-sections 406 are designed to provide multiple reflections for non-image beams received from the PBS. The current invention allows for higher intensity light beams to be managed (i.e. absorbed) inside high light intensity applications, such as projectors. The light absorption capabilities are not as efficiently achieved otherwise, since the structured surface (V-sections 406) of the present invention will reflect less light back to the PBS than, for example, a flat anodized aluminum surface would.

EXAMPLES

An aluminum black anodized light absorber with the geometry shown and discussed previously in FIGS. 3, 3A and 4 was tested in a front projection system. The front projector used was an Epson PowerLite 81p Multimedia Projector. In the light absorber, the included angles of the V-sections and the angles of the sharp corners were about 17 degrees, with a maximum radius at the sharp corners and at bottom of the V-grooves of 0.005 inch (0.01 cm). The depth of each cut was about 0.067 inches (0.17 cm). The projection lamp of the projector was rated at 200 Watts. Two 3.48 Watt fans having rated airflow of 10.6 cfm each were used to cool the polarizers.

The maximum amount of total energy absorbed by three absorptive polarizers in this projector was determined to be about 4.5 Watts. The amount of energy absorption was determined by measuring spectral irradiance of the red, green, and blue beams in the Epson projector. Measurements were made with the detector at the exit lens of the beam. Energy outputs in the 300-800 nm were measured using Optronics OL754 OPMT spectroradiometer, calibrated with an Optronics OL752-10J standard lamp that is traceable to NIST. Energy outputs in the 800 to 1600 nm were measured using an Optronics OL754 NIR spectroradiometer calibrated with the same standard lamp.

Example 1

Figure 5:
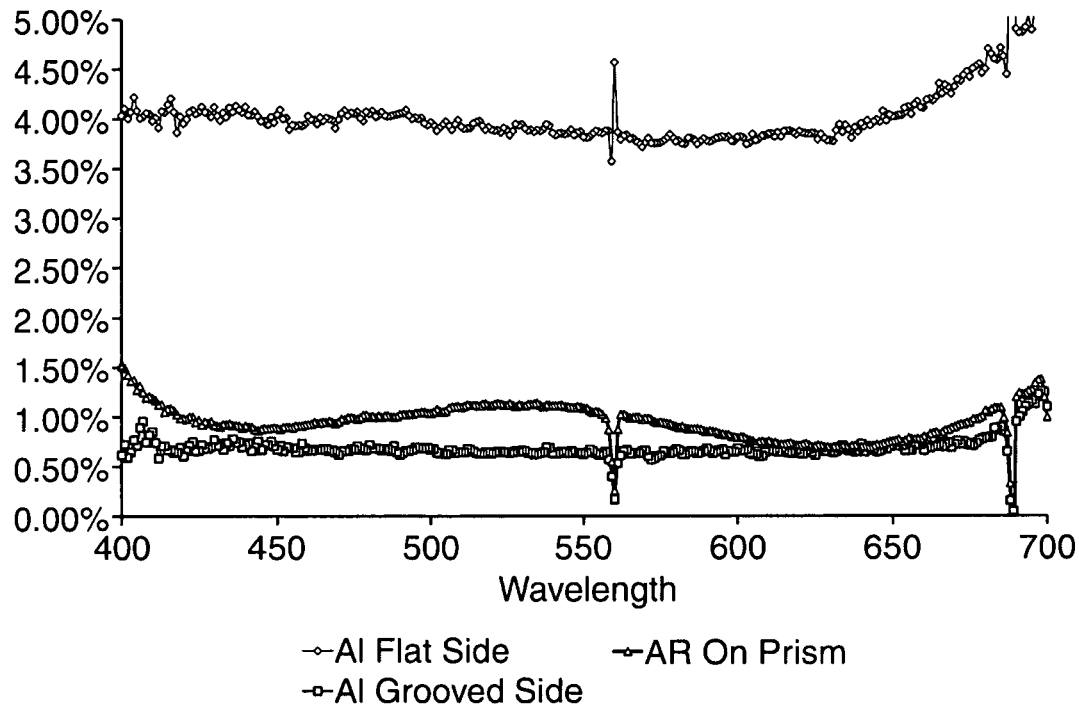
FIG. 5 shows the results of measurements of total reflection spectra of a structured surface and flat surface.
Figure 6:
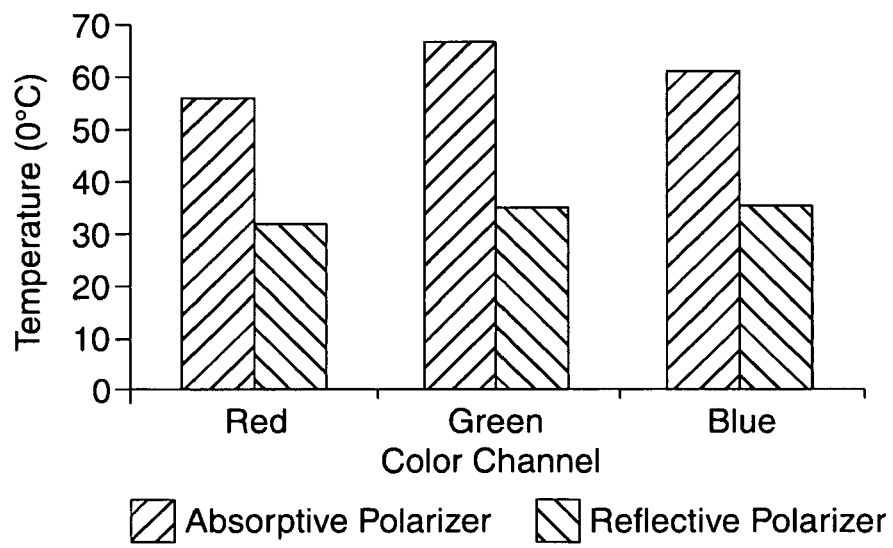
FIG. 6 shows temperature measurements taken from absorptive polarizers in the dark state and temperature measurements taken from reflective polarizers in the dark state.

A sample light capture portion with the V-section microstructure described above was fabricated using Aluminum and anodized after machining. A second light capture portion was fabricated in the same fashion except that it did not include the V-section microstructure. Additionally, an anti-reflective surface of one PBS from the system was also evaluated. Light was shined onto the individual samples at normal incident angle. Anti-reflection coating was applied to the PBS surface to reduce reflection of light back to the panel, which could complicate the contrast of the display. The AR coating was a multi layered thin film coating, with ¼ wavelength optical thickness. The coating was designed to have destructive interference at certain wavelength so that reflection could be reduced. Reflection spectra from the samples were collected using a Lamda 900 spectrometer (PerkinElmer). FIG. 5 shows the results of measurements of total reflection spectra of the microstructured surface compared to the flat (not microstructured) surface with the same black anodization. The structured surface reduced the total reflection from 4% to 0.6% over the entire visible spectrum. Additionally, it is shown that the structured anodized aluminum surface has less reflection than the AR coated glass prisms surface, at around 1%.

Example 2

The Epson projector was placed in the "dark" state, where no light was directed through the projection lens of the projector. Temperature on the absorptive polarizers of the Epson projector was measured using a HH305/306 Thermometer (Omega Engineering, Inc.). The Epson 81p projector was modified to substitute a PBS formed of a reflective polarizer between two glass covers in place of each absorptive polarizer. A light absorber was attached proximate to each PBS in the non-image light path. The projector was placed in the "dark" state and the temperature of the reflective polarizer at a point on the PBS was measured using a HH305/306 Thermometer.

FIG. 7 shows temperature measurements taken from the absorptive polarizers in the dark state and temperature measurements taken from reflective polarizers in the dark state.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

We claim:

1. An optical unit, comprising:
    a polarizing beamsplitter (PBS), including a reflective polarizer acting to transmit a portion of a light beam having a first polarization and reflect a portion of the light beam having a second polarization, the PBS further comprising a first cover having a first surface and a second surface for transmitting a light beam; and a second cover having at least a first surface for transmitting the light beam, the second cover arranged with its first surface opposing the first surface of the first cover;
    wherein the reflective polarizer is disposed between the first surfaces of the first and second covers; and
    a light absorbing device operatively disposed relative to the PBS so as to receive the light either transmitted or reflected by the PBS, the light absorbing device including a light capture portion having a structured surface.

2. The unit recited in claim 1, the structured surface further comprising:
    a plurality of V-sections having sharp corners disposed proximate to the PBS and a plurality of included angles each forming an angle of about 25 degrees or less.

3. The unit recited in claim 1, the light absorption device further comprising:
    a heat dissipation portion secured to a back surface of the light capture portion.

4. The unit recited in claim 3, wherein the heat dissipation portion is a heatsink having a plurality of fins.

5. The unit recited in claim 1, wherein the reflective polarizing layer comprises a multilayer polymer optical film.

6. The unit recited in claim 5, wherein the reflective polarizing layer is formed of alternating layers of different polymer materials, where one of the sets of alternating layers is formed of a birefringent material and the refractive indices of the different materials are matched for light polarized in one linear polarization state and unmatched for light in the orthogonal linear polarization state.

7. The unit recited in claim 1, further comprising an image-forming device disposed on an optical path passing through the first cover.

8. The unit recited in claim 7, wherein the image-forming device comprises a transmissive liquid crystal image-forming device.

9. The unit as recited in claim 7, further comprising:
at least a second PBS, at least a second image-forming device and a color combining unit, image light from the first and at least a second image-forming device being combined in the color combining unit to produce combined image beam.

10. The unit as recited in claim 9 further comprising:
at least a third PBS and at least a third image-forming device, image light from the first, second and at least a third image-forming device being combined in the color combining unit to produce the combined image beam.

11. The unit as recited in claim 10, wherein the color combining unit comprises:
an x-cube color combining unit, the first, second and third PBSs being attached to the x-cube color combining unit, the first, second and third image-forming devices being attached to the first, second and third PBSs respectively.

12. The unit recited in claim 1, wherein the light absorption device is disposed on an optical path passing through the second surface of the first cover.

13. The unit as recited in claim 1, further comprising:
a projection lens unit arranged to project an image from the image-forming device.

14. An optical system, comprising:
a color combiner unit having at least three entrance faces associated with different color bands;
at least three polarizing beamsplitters (PBSs) operatively disposed relative to the at least three entrance faces respectively, each of the PBSs comprising a first reflective polarizing layer disposed between respective first surfaces of first and second covers, the second cover positioned between the reflective polarizing layer and the color combiner unit;
a light absorbing device operatively disposed relative to the PBS so as to receive the light either transmitted or reflected by the PBS, the light absorbing device including:
a light capture portion having a structured surface; and
a heat dissipation portion secured to a back surface of the light capture portion;
first, second and third transmissive image-forming devices operatively disposed respectively proximate the first, second and third PBSs;
a light source and light management optics arranged to direct illumination light to the three PBSs; and
a projection lens unit arranged to project an image received from the color combiner unit.

15. The unit recited in claim 14, wherein the heat dissipation portion is a black anodized aluminum heatsink having a plurality of fins.

16. The unit recited in claim 14, wherein the reflective polarizing layer comprises:
a plurality of alternating layers of different polymer materials, where one of the sets of alternating layers is formed of a birefringent material and the refractive indices of the different materials are matched for light polarized in one linear polarization state and unmatched for light in the orthogonal linear polarization state.

17. The unit recited in claim 14, the structured surface further comprising:
a plurality of V-sections having sharp corners and a plurality of included angles each forming an angle of about 25 degrees or less.

* * * * *

UNITED STATES PATENT AND TRADEMARK OFFICE
CERTIFICATE OF CORRECTION

PATENT NO. : 7,475,991 B2 Page 1 of 1
APPLICATION NO. : 11/315811
DATED : January 13, 2009
INVENTOR(S) : Jiaying Ma It is certified that error appears in the above-identified patent and that said Letters Patent is hereby corrected as shown below:

Title Page, Column 1 (U.S. Patent Documents)
Line 2, below "4,974,132" insert -- 5,826,959 A 10/1998 Atsuchi........353/20 --.

Page 2, Column 1 (U.S. Patent Documents)
Line 4, below "6,646,806" insert -- 6,669,344 B2 12/2003 Ishii........353/20 --.

Line 13, below "7,077,526" insert -- 7,101,047 B2 09/2006 Florence et al. ........353/20 --.

Line 16, below "2004/0227994" insert -- 2005/0007555 A1 01/2006 Manabe et al. ........353/33 --.

Line 19, below "2006/0103791" insert -- 2006/0262275 A1 11/2006 Domroese et al. ........353/20 --.

Signed and Sealed this

Fourteenth Day of April, 2009

JOHN DOLL
*Acting Director of the United States Patent and Trademark Office*